(12) United States Patent
Bowers et al.

(10) Patent No.: US 6,643,425 B1
(45) Date of Patent: Nov. 4, 2003

(54) OPTICAL SWITCH HAVING SWITCH MIRROR ARRAYS CONTROLLED BY SCANNING BEAMS

(75) Inventors: John Bowers, Santa Barbara, CA (US); Chandrasekhar Pusarla, Goleta, CA (US); Kevin White, Los Gatos, CA (US); Dan Blumenthal, Santa Barbara, CA (US); Roger Helkey, Monteato, CA (US); John Chong, Santa Barbara, CA (US); David Welsh, Goleta, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 09/642,241

(22) Filed: Aug. 17, 2000

(51) Int. Cl.[7] .................................................. G02B 6/35
(52) U.S. Cl. .............................. 385/18; 385/16; 385/17; 385/19; 359/223
(58) Field of Search ....................... 385/16–19; 359/293, 359/224

(56) References Cited

U.S. PATENT DOCUMENTS

| | | |
|---|---|---|
| 2,982,859 A | 5/1961 | Steinbrecher |
| 3,649,105 A | 3/1972 | Treuthart |
| 3,990,780 A | 11/1976 | Dakss |
| 4,303,302 A | 12/1981 | Ramsey et al. |
| 4,365,863 A | 12/1982 | Broussaud |
| 4,378,144 A | 3/1983 | Duck et al. |
| 4,421,381 A | 12/1983 | Ueda et al. ................... 350/6.6 |
| 4,598,585 A | 7/1986 | Boxenhorn .................... 73/505 |
| 4,626,066 A | 12/1986 | Levinson |
| 4,654,663 A | 3/1987 | Alsenz et al. ............. 340/870.3 |
| 4,657,339 A | 4/1987 | Fick |
| 4,677,290 A | 6/1987 | Mitch |
| 4,696,062 A | 9/1987 | LaBudde |
| 4,855,017 A | 8/1989 | Douglas |
| 4,866,699 A | 9/1989 | Brackett et al. |
| 4,922,756 A | 5/1990 | Henrion ...................... 73/517 R |
| 5,016,072 A | 5/1991 | Greiff ............................ 357/26 |
| 5,030,004 A | 7/1991 | Grant et al. |
| 5,083,857 A | 1/1992 | Hornbeck .................... 359/291 |
| 5,097,354 A | 3/1992 | Goto ........................... 359/212 |
| 5,172,262 A | 12/1992 | Hornbeck .................... 359/223 |

(List continued on next page.)

FOREIGN PATENT DOCUMENTS

| | | |
|---|---|---|
| DE | 2205362 B | 7/1973 |
| DE | 2436265 A | 2/1976 |

(List continued on next page.)

OTHER PUBLICATIONS

Lau, K.Y.: "MEM'S The Word for Optical Beam Manipulation", IEEE Circuits and Devices Magazine, IEEE Inc. New York, US, vol. 13, No. 4, Jul. 1997, pp. 11–18, XP000831634, ISSN: 8755–3996 chapter "MEM–Based Optical Switches" on p. 17.

(List continued on next page.)

*Primary Examiner*—Hemang Sanghavi
*Assistant Examiner*—Scott Knauss
(74) *Attorney, Agent, or Firm*—Blakey, Sokoloff, Taylor & Zafman LLP

(57) ABSTRACT

An optical switch having switch mirror arrays controlled by scanning beams that reduce the amount of electrical connections required and reduce the complexity for constructing large optical switches. Movement of the switch mirror arrays is controlled by one or more scanning beams. The optical switch includes one or more arrays of optical switch inputs and outputs and one or more arrays of movable mirrors to direct light beams from the optical switch inputs to the optical switch outputs. The optical switch also includes one or more control elements to control the movable mirrors based on scanning beams directed to the one or more control elements.

49 Claims, 7 Drawing Sheets

U.S. PATENT DOCUMENTS

| | | | | |
|---|---|---|---|---|
| 5,203,208 | A | | 4/1993 | Bernstein ..................... 73/505 |
| 5,226,321 | A | | 7/1993 | Varnham et al. .............. 73/505 |
| 5,271,075 | A | * | 12/1993 | Gfeller et al. ................. 385/20 |
| 5,488,862 | A | | 2/1996 | Neukermans et al. .... 73/504.02 |
| 5,524,153 | A | | 6/1996 | Laor ........................... 385/16 |
| 5,536,988 | A | | 7/1996 | Zhang et al. ............... 310/309 |
| 5,541,756 | A | | 7/1996 | Chang-Hasnain et al. |
| 5,555,558 | A | | 9/1996 | Laughlin |
| 5,627,669 | A | | 5/1997 | Orino et al. |
| 5,629,790 | A | | 5/1997 | Neukermans et al. ....... 359/198 |
| 5,670,881 | A | | 9/1997 | Arakawa et al. |
| 5,673,139 | A | | 9/1997 | Johnson ..................... 359/291 |
| 5,796,880 | A | | 8/1998 | Ford et al. |
| 5,878,177 | A | | 3/1999 | Karasan et al. |
| 5,920,417 | A | | 7/1999 | Johnson ..................... 359/223 |
| 5,943,157 | A | | 8/1999 | Florence et al. |
| 5,943,454 | A | | 8/1999 | Aksyuk et al. |
| 5,960,132 | A | | 9/1999 | Lin |
| 5,960,133 | A | | 9/1999 | Tomlinson |
| 6,000,280 | A | | 12/1999 | Miller et al. .................. 73/105 |
| 6,031,656 | A | * | 2/2000 | Little et al. ................. 348/795 |
| 6,075,239 | A | * | 6/2000 | Aksyuk et al. ............. 250/229 |
| 6,097,858 | A | | 8/2000 | Laor ........................... 385/16 |
| 6,097,859 | A | | 8/2000 | Solgaard et al. |
| 6,097,860 | A | | 8/2000 | Laor ........................... 385/17 |
| 6,101,299 | A | * | 8/2000 | Laor ........................... 385/16 |
| 6,253,001 | B1 | * | 6/2001 | Hoen ........................... 385/17 |
| 6,278,812 | B1 | | 8/2001 | Lin et al. |
| 6,289,145 | B1 | | 9/2001 | Solgaard et al. |
| 6,295,154 | B1 | | 9/2001 | Laor et al. |
| 6,320,993 | B1 | * | 11/2001 | Laor ........................... 385/16 |
| 6,330,102 | B1 | | 12/2001 | Daneman et al. |
| 6,337,760 | B1 | | 1/2002 | Huibers et al. |

FOREIGN PATENT DOCUMENTS

| | | |
|---|---|---|
| EP | 0 834759 A2 | 4/1998 |
| GB | 2175705 A | 12/1986 |
| GB | 2 275 787 A | 9/1994 |
| JP | 60-107017 | 6/1985 |
| JP | 5-107485 | 4/1993 |
| JP | 6-180428 | 6/1994 |
| WO | WO 99/66354 | 12/1999 |
| WO | WO 00/20899 | 4/2000 |

OTHER PUBLICATIONS

Patent Abstracts of Japan, vol. 2000, No. 04, Aug. 31, 2000. JP 2000 019434A (Nippon Signal Co. Ltd: The), Jan. 21, 2000.

PCT Ssearch Report No. PCT/US 01/23323 dated Jul. 24, 2001, 4 pages.

Janusz bryzek, Kurt Petersen, & Wendell McCulley, "Micromachines on the March," IEEE Spectrum, pp. 20–31 (May 1994).

"Lucent's New All–Optical Router Uses Bell Labs Microscopic Mirrors," Bells Labs press release, pp. 1–4, Nov. 10, 1999. http://www.bell–labs.com/news/1999/november/10/1.html.

M. Adrian Michalicek, Wenge Zhang, Kevin F. Harsh, Victor M. Bright, and Y.C. Lee, "Micromirror Arrays Fabricated by Flip–Chip Assembly," Part of the SPIE Conference on Miniaturizes Systems with Micro–Optics and MEMs, Santa Clara, SPIE vol. 3878, pp. 68–79 (Sep. 1999).

Joseph E. Ford, Vladimir A. Aksyuk, David J. Bishop, and James A. Walker, "Wavelength Add–Drop Switching Using Tilting Micromirrors," Journal of Lightwave Technology, vol. 17, No. 5, pp. 904–911 (May 1999).

Wu, Ming C., "MEMS for Optical and RF Applications", Department of Engineering, Information Systems, and Technical Management, Nov. 1–3, 1999, Engineering: 823.52.

Mihailovich, Zhang, Shaw, MacDonald, "Single–Crystal Silicon Torsional Resonators", 0–7803–0957–2/93, 1993 IEEE, p. 184–188.

* cited by examiner

OPTICAL SWITCH HAVING SWITCH MIRROR ARRAYS CONTROLLED BY SCANNING BEAMS

FIELD OF THE INVENTION

The present invention relates generally to optical switches and switch mirror arrays. More particularly, the present invention relates to micro-electro-mechanical-system (MEMS) switch mirror arrays. Specifically, the present invention relates to an optical switch having switch mirror arrays controlled by scanning beams.

BACKGROUND OF THE INVENTION

An optical switch is a switching device that couples light beams from an input fiber to an output fiber. Typically, the light beams from an input fiber are collimated and directed toward a desired location such as an output fiber. A movable mirror (e.g., a gimbaled mirror) in a switch mirror array redirects light beams to desired locations. A common way of moving the mirror is by electrostatic actuation using electrodes, which are positioned below the mirror. A voltage is applied to the electrodes that creates an electric field, which causes the mirror to pivot. To address and control each individual mirror in a switch mirror array, a large number of electrical connections is required to provide voltage to the electrodes.

Thus, a limitation with constructing large optical switches with a large number of mirrors is the amount of electrical connections needed to address and drive each mirror. Typically, a mirror requires four electrostatic electrodes to move the mirror in different directions from its equilibrium position. As such, a controller or driver must be electrically connected to each electrode. Consequently, to have a large number of mirrors for an optical switch, a large amount of space is required to accommodate for the number of electrical connections needed for the electrodes. Therefore, constructing a large optical switch with a large number of mirrors becomes complex due to the amount of electrical connections needed.

SUMMARY OF THE INVENTION

An optical switch having switch mirror arrays controlled by scanning beams is disclosed. Movement of individual mirrors in switch mirror arrays is controlled by one or more scanning beams. The optical switch includes one or more arrays of optical switch inputs and outputs and one or more arrays of movable mirrors to direct light beams from the optical switch inputs to the optical switch outputs. The optical switch also includes one or more control elements to control the movable mirrors based on scanning beams directed to the one or more control elements.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

An optical switch having switch mirror arrays controlled by scanning beams is described. Movement of individual mirrors in switch mirror arrays is controlled by one or more scanning beams. The optical switch includes one or more arrays of optical switch inputs and outputs and one or more arrays of movable mirrors to direct light beams from the optical switch inputs to the optical switch outputs. The optical switch also includes one or more control elements to control the movable mirrors based on scanning beams directed to the one or more control elements.

The switch mirror array control techniques described herein reduce the amount of electrical connections needed to control individual mirrors by using a scanning beam. That is, a scanning beam can be directed to a particular control element to move and change selectively the position of a mirror. As such, the scanning beam does not need an electrical connection to the control element because the scanning beam is transmitted in free space thereby allowing more space to be used on a substrate to form individual mirrors. Thus, the mirror array control techniques described herein reduce the complexity and the number of electrical connections needed to construct large optical switches.

Figure 1:
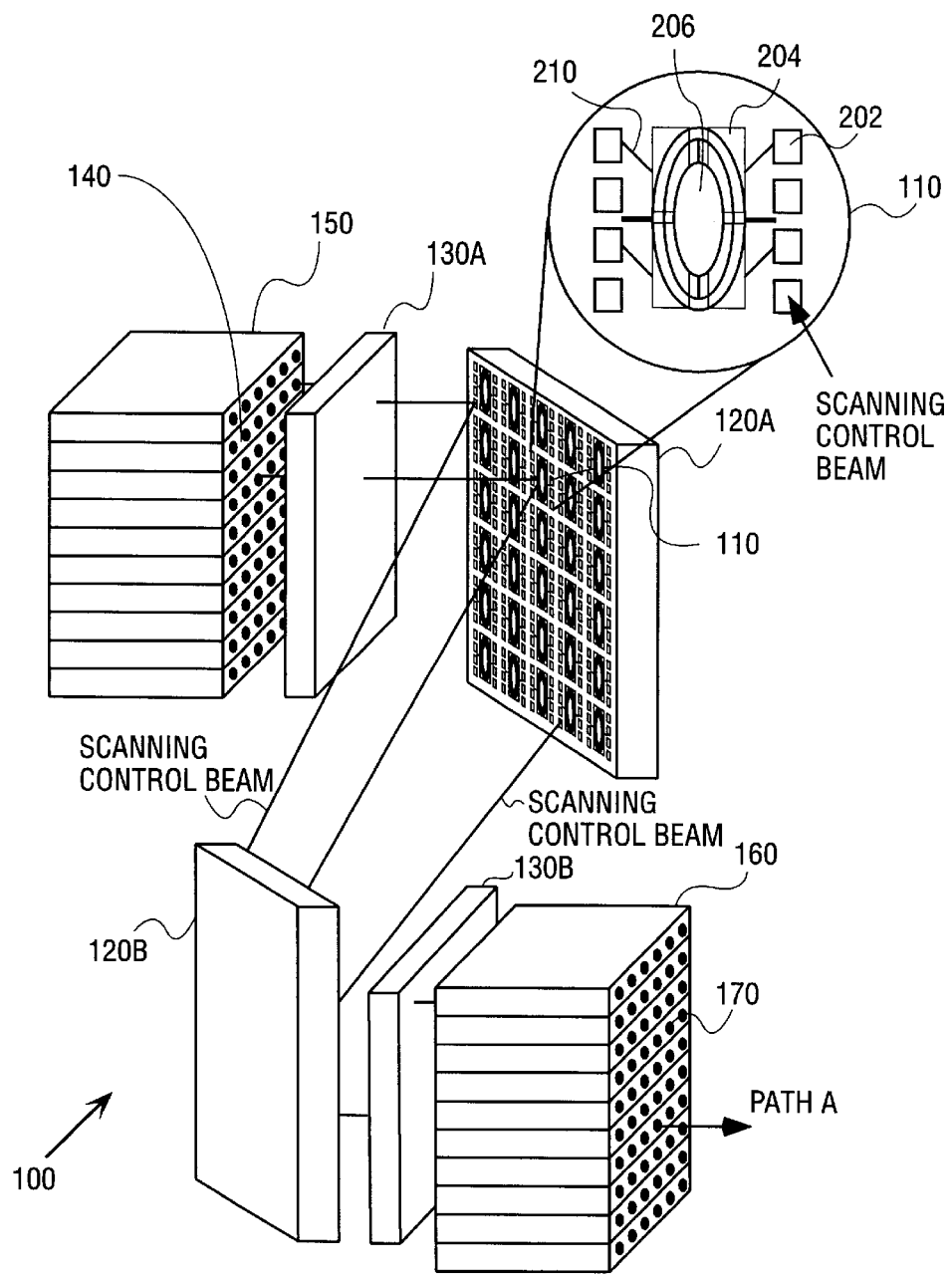
FIG. 1 illustrates an exemplary optical switching system for practicing the invention using scanning control beams to control individual mirrors in switch mirror arrays.

FIG. 1 illustrates an exemplary optical switching system 100 for practicing the invention using scanning control beams to control individual mirrors in switch mirror arrays. The optical switching system 100 represents a three-dimensional all-optical switching system. A three-dimensional all-optical switching system allows for optical coupling between input fibers and output fibers in different planes using lens arrays and switch mirror arrays.

The lens arrays and switch mirror arrays provide proper angle and position for light beams traveling from input fibers to output fibers. That is, a light beam must leave and enter a fiber in a direct path.

In the following description of FIG. 1, switch mirror arrays are described as micro-electro-mechanical-system (MEMS) switch mirror arrays. MEMS switch mirror arrays are arrays of microscopic mirror devices formed with a substrate using integrated circuit (IC) fabrication techniques. The mirror devices can redirect beams of light to varying positions. For example, the mirror devices can be gimbaled mirror devices. Gimbaled mirror devices include a mirror component, which is suspended off a substrate, and is able to pivot about a hinge caused by electrostatic actuation from electrodes. Electrostatic actuation creates an electric field by a voltage being applied to the electrodes, which causes the mirror component to pivot. By allowing the mirror component to pivot, the mirror component is capable of having an angular range of motion in which the mirror component can redirect light beams to varying positions.

Referring to FIG. 1, optical switching system 100 includes input fiber "block" array 150, first lens array 130A, first MEMS switch mirror array 120A, second MEMS switch mirror array 120B, second lens array 130B, and output fiber "block" array 160.

Input fiber array 150 positions a plurality of optical fibers 140 in a two-dimensional array having a polished end-face. The optical fibers 140 transmit light beams to first lens array 130A. First lens array 130A includes a plurality of optical lenses for each optical fiber 140, which are used to collimate light beams and to direct the light beams to individual MEMS mirror devices 110 on first MEMS switch mirror array 120A. First lens array 130A may be connected with input fiber array 150 or, alternatively, first lens array 130A may be a separate unit placed in front of input fiber array 150.

First MEMS switch mirror array 120A includes a plurality of individual MEMS mirror devices 110. For example, MEMS mirror device 110 may be a gimbaled mirror device having a rectangular, elliptical, or circular shape. MEMS mirror device 110 may have other shapes or configurations to redirect beams of light.

As shown in FIG. 1, a blown-up view of MEMS mirror device 110 is illustrated showing a mirror component 206, electrodes 204, and control elements 202. A scanning control beam is used to scan across the control elements 202, which provides selectively drive voltage for electrodes 202 (based on a received scanning control beam) via connection 210 in creating electrostatic actuation to move gimbaled mirror 206. The scanning control beam is transmitted in free space to control elements 202, which can be used to control movement of individual MEMS mirror devices 110. Thus, the plurality of MEMS mirror devices 110 for first MEMS switch mirror array 120A can control a mirror component 206 to redirect or reflect beams of light to varying MEMS mirror devices on second MEMS mirror switch array 120B using a scanning control beam directed to control elements 202.

Second MEMS switch mirror array 120B also includes a plurality of MEMS mirror devices such as MEMS mirror device 110, which are used to redirect and reflect light beams to corresponding lenses on second lens array 130B. Second lens array 130B accepts collimated light beams from second MEMS switch mirror array 120B and directs the light beams to individual output fibers 170 of output fiber array 160. Second lens array 130B may be connected with input fiber array 160 or, alternatively, second lens array 130B may be a separate unit placed in front of output fiber array 160.

Optical switching system 100 allows light beams from any input fiber 140 of input fiber array 150 to be redirected to any output fiber 170 of output fiber array 160 by changing the angle of mirrors 110 in mirror arrays 120A and 120B. Optical switch system 100 may also provide fibers to output the scanning control beam, which is used by control elements 202 to control the movement of a mirror device 110.

For example, a light beam following the path "A" is outputted from one input fiber and is redirected using first lens array 130A, second lens array 130B, and MEMS mirror arrays 120A and 120B to a different output fiber. Furthermore, input fiber array 150 and output fiber array 160 can provide a fiber to output a scanning control beam, which can be directed to individual control elements 202 for a mirror device 110. Optical switching system 100 may be implemented in, for example, scanning systems, printing systems, display systems, raster systems and other systems that require redirecting beams of light.

Figure 2:
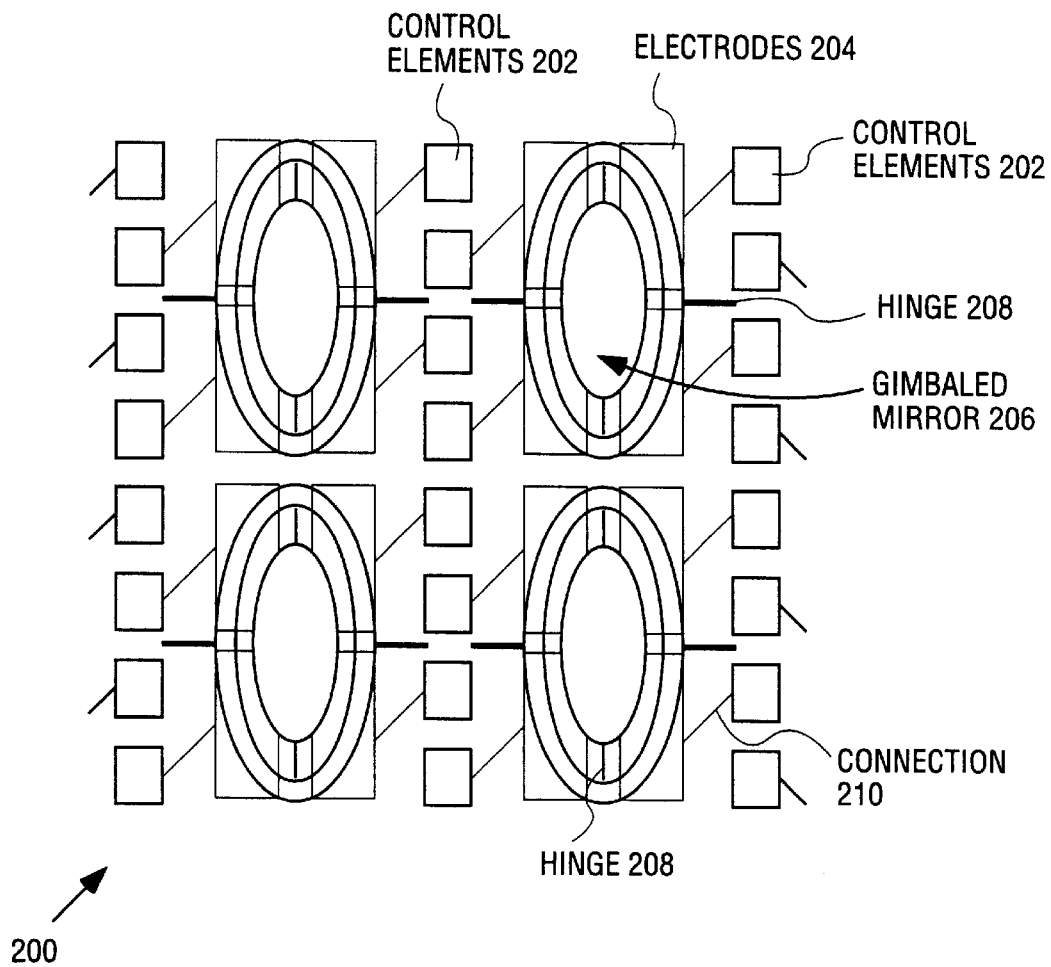
FIG. 2 illustrates a top view of an exemplary switch mirror array with control elements for receiving scanning control beams.

FIG. 2 illustrates a top view of an exemplary switch mirror array 200 with control elements for receiving scanning control beams. Referring to FIG. 2, a plurality of gimbaled mirrors 206 are shown. Gimbaled mirror 206 is a mirror device that can pivot about hinge 208. For example, gimbaled mirror 206 may be a MEMS mirror device. Electrodes 204 are positioned under gimbaled mirror 206 and are used to move gimbaled mirror 206 by electrostatic actuation. Electrodes 204 are coupled to control elements 202 via a connection 210. Control elements 202 provide selectively electrode drive voltage to electrodes 204. Control elements 202 provide selectively the electrode drive voltage based on a scanning control beam being directed toward the control elements 202.

For one implementation, switch mirror array 200 includes control elements 202, which react to scanning control "optical" beams. For example, control elements 202 can be a silicon material, which is affected by optical beams (i.e., a photosensitive device). A photosensitive device is a device that allows current to flow as a result of exposure to radiant ("light") power. Control elements 202 may include a photodiode, photodetector, phototransistor, or other like photosensitive devices.

The control elements 202 are coupled to an electrode drive voltage source that can provide selectively drive voltage to electrodes 204 if a light beam or an optical beam exposes the photosensitive device. For example, control elements 202 having a photosensitive device will produce electron-hole pairs to allow current to flow if exposed to a light beam or an optical beam thus providing a drive voltage to electrodes 204. That is, the electron-hole pairs provide a conduction path until the slower holes are swept from the semi-insulating region. Such a conduction path can be used to drive selectively electrodes 204 with a drive voltage to control gimbaled mirrors 206.

For other implementations, control elements 202 can include a combination of well-known circuitry with photosensitive devices (i.e., photoconductive circuitry) to drive selectively electrodes 204 in controlling the movement of gimbaled mirror 206. For example, control elements 202 may include resistors and capacitors coupled with photosensitive devices, as illustrated in FIGS. 3A through 3E, to control movement of gimbaled mirrors 206.

For alternative implementation, control elements 202 can be omitted and electrodes 204 may have conductive pads that receive scanning control "electron" beams. That is, gimbaled mirror 206 can be controlled remotely by scanning an electron beam across the conductive pads of electrodes 204 in switch mirror array 200, as illustrated in FIG. 2. Electrons striking the surface of the conductive pads of electrodes 204 create a charge proportional to the intensity of the electron beam. The electron beam is scanned across the conductive pads and modulated to provide different voltages to vary the movement of gimbaled mirror 206 from its equilibrium position. The voltage on the electrodes 204 can be increased or decreased by having the electron beam strike the contact pad itself or, alternatively, an adjacent bias pad.

The exemplary switch mirror array 200 with control elements 202 for receiving scanning control beams avoids having separate electrical connections between individual electrodes 204 and a drive voltage source to move selectively individual mirror devices. For example, in a 1,000-element mirror array, the conventional approach requires 4,000 electrical connections (one for each of the four electrodes associated with an individual mirror device). By way of contrast, using an exemplary switch mirror array 200 for a 1,000-element mirror array, less than 100 electrical connections can be used because a drive voltage can be connected to a column or row of control elements 202 in the switch mirror array 200. Furthermore, a connection between a scanning control beam source and control elements 202 is not necessary because the scanning control beam travels in free space.

FIGS. 3A through 3E illustrate exemplary circuitry for control elements 202 of FIG. 2. The exemplary circuitry provide a drive voltage for electrodes 204 via connections 210. Because connections 210 occupy a small amount of space and each individual gimbaled mirror 206 can be controlled selectively by scanning a control beam on particular control elements 202, a reduced amount of electrical connections is required thereby allowing a larger number of mirrors to be formed for an optical switch.

The following exemplary circuitry for control elements 202 also work well to solve leakage that may occur off electrodes 204 that provide electrostatic actuation for gimbaled mirror 206. Furthermore, for the following description of the circuits shown in FIGS. 3A through 3E, the resistors may represent an actual resistor or a parasitic resistor created as part of the electrode structure.

Figure 3A:
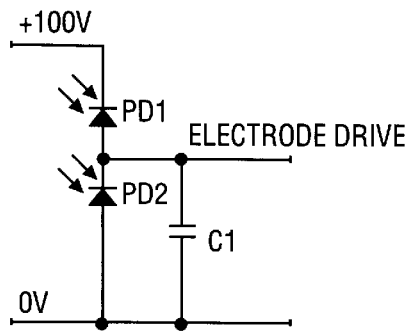
FIGS. 3A through 3E illustrate exemplary circuitry for the control elements of FIG. 2.

Referring to FIG. 3A, an exemplary optical drive circuit is shown. The exemplary optical drive circuit includes a photodiode PD1 connected in series with a photodiode PD2. A +100V source is connected with photodiode PD1 and a ground (0 V) is connected with the photodiode PD2 and capacitor C1. Capacitor C1 is connected in parallel with the photodiode PD2.

The circuit operates by illuminating photodiodes PD1 and PD2 with a scanning control optical beam. Photodiodes PD1 and PD2 are illuminated sequentially. The junction between photodiodes PD1 and PD2 is used to provide an electrode drive voltage for electrode 204 to move gimbaled mirror 206. For a mirror device requiring four electrodes, four circuits would be required to control gimbaled mirror 206.

If photodiode PD1 is illuminated, photodiode PD1 will pass current from the +100V source to charge the capacitor C1 in a positive direction. The intensity of the illumination will control how fast capacitor C1 charges and combined with the duration of the illumination will control the final voltage for electrode 204. This voltage then drives electrode 204 that is connected with the circuit to move gimbaled mirror 206.

If PD2 is illuminated, capacitor C1 is discharged. The illumination of photodiodes PD1 and PD2 control the rate of discharge for capacitor C1. For one implementation, a feedback system can be used to control the illumination of photodiodes PD1 and PD2 to move gimbaled mirror 206. If photodiode PD2 is illuminated with sufficient intensity, capacitor C1 can be discharged completely to the 0 voltage line to obtain a defined starting point for controlling gimbaled mirror 206.

Figure 3B:
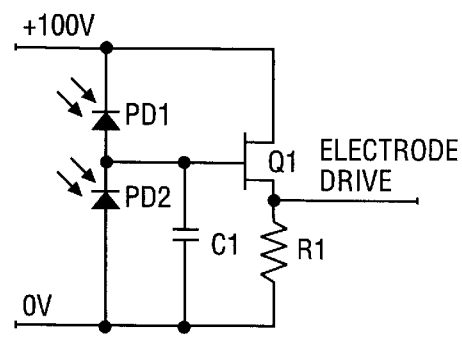

Referring to FIG. 3B, the circuit includes a photodiode PD1 connected in series with a photodiode PD2. A +100 voltage source is connected with photodiode PD1 and a drain of a field effect transistor (FET) Q1. A ground (0V) is connected with photodiode PD2, capacitor C1, and resistor R1. The gate of FET Q1 is connected to capacitor C1, photodiode PD2, and photodiode PD1. The source of FET Q1 is connected resistor R1. The junction between the drain of FET Q1 and resistor R1 is used to provide an electrode drive voltage for electrode 204 to move gimbaled mirror 206.

The circuit operates in the same manner as FIG. 3A except that the FET Q1 isolates the voltage on capacitor C1 from any leakage from a connected electrode 204. The resistor R1 is used to exploit the discharge of the capacitance on capacitor C1 from the connected electrode 204 if photodiode PD2 is illuminated to reduce the voltage on the connected electrode 204. The FET Q1 cannot operate to sink current from the connected electrode, but can only sink a source current.

Figure 3C:
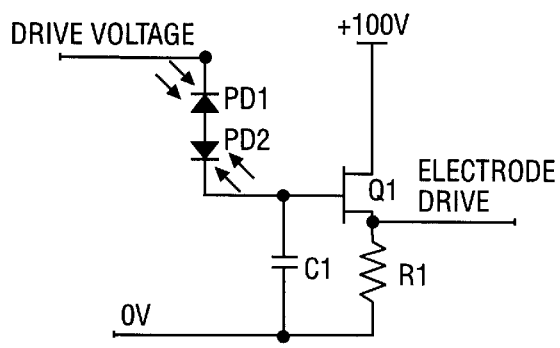

Referring to FIG. 3C, the circuit includes a photodiode PD1 connected in series with a photodiode PD2 and capacitor C1. A drive voltage is connected with photodiode PD1 and a drain of FET Q1. A ground (0V) is connected with capacitor C1 and resistor R1. The source of FET Q1 is connected with resistor R1. The gate of FET Q1 is connected with capacitor C1 and photodiode PD2. The junction between the source FET Q1 and resistor R1 is used to provide an electrode drive voltage for electrode 204 to move gimbaled mirror 206.

The circuit operates by illuminating sequentially photodiodes PD1 and PD2 by a scanning control optical beam. While the photodiodes PD1 and PD2 are illuminated, the drive voltage input is set to the particular voltage required for a connected electrode 204. Photodiodes PD1 and PD2 will be conductive when illuminated and conduct the drive voltage to the capacitor C1. When the scanning beam stops illuminating photodiodes PD1 and PD2, the voltage on C1 will be maintained because the photodiodes PD1 and PD2 will be non-conductive if not illuminated.

Figure 3D:
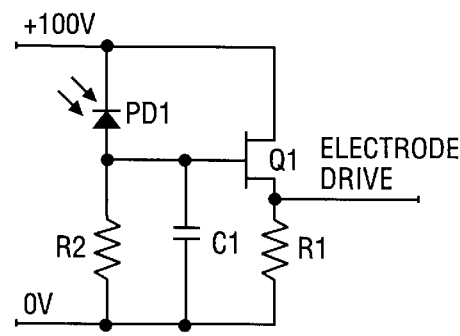

Referring to FIG. 3D, the circuit includes a single photodiode PD1 connected in series with a resistor R2. A +100 voltage source is connected to photodiode PD1 and a drain of FET Q1. A capacitor C1 is connected in parallel with resistor R2. A ground (0V) is connected with resistor R2, capacitor C1, and resistor R1. The gate of FET Q1 is connected with capacitor C1, resistor R2, and photodiode PD1. The source of FET Q1 is connected with resistor R1. The junction between the source of FET Q1 and resistor R1 is used to provide an electrode drive voltage for electrode 204 to move gimbaled mirror 206.

The circuit operates in similar manner as the circuit in FIG. 3C in which a lower photodiode is replaced with a resistor R2. The voltage on capacitor C1 varies until the average current induced in photodiode PD1 by the optical beam illumination is balanced by the current in resistor R1. When the illumination on photodiode PD1 increases, the electrode drive voltage will increase. Likewise, when the illumination on photodiode PD1 decreases, the electrode drive voltage will decrease.

Figure 3E:
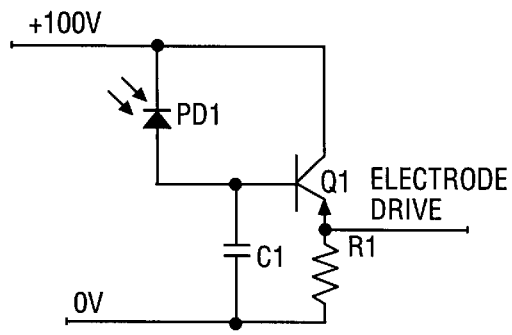

Referring to FIG. 3E, the circuit includes a single photodiode PD1 connected in series with the capacitor C1. A +100 voltage source is connected with photodiode PD1 and a drain of a bipolar transistor Q1. A ground (0V) is connected with capacitor C1 and resistor R1. A base of transistor Q1 is connected with capacitor C1 and photodiode PD1. The junction between the emitter of transistor Q1 and resistor R1 is used to provide an electrode drive voltage for electrode 204 to move gimbaled mirror 206. The circuit operates in a similar manner as the circuit of FIG. 3D with the FET Q1 replaced with a bipolar transistor and resistor R2 removed. The base current of transistor Q1 is exploited to discharge C1 without the need for a resistor.

Figure 4:
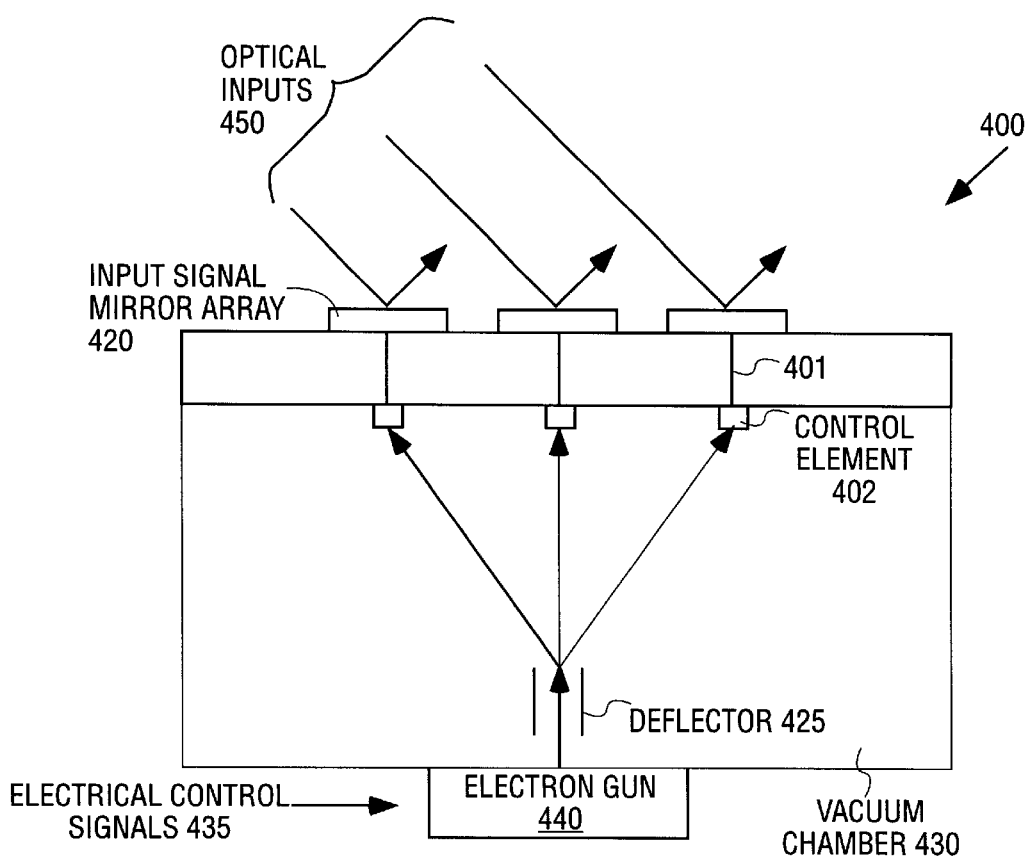
FIG. 4 illustrates a side view of an exemplary optical switching device to control a switch mirror array using a scanning electron beam.

FIG. 4 illustrates a side view of an exemplary optical switching device 400 to control a switch mirror array using a scanning electron beam. Referring to FIG. 4, optical switching system 400 includes an electron gun 440 receiving electrical control signals 435, a vacuum chamber with a deflector 425, and control elements 402 connected with an input signal mirror array 420.

The control elements 402 are bombarded with electrons from the electron gun 440 in the vacuum chamber 430. Conductive pads (not shown) in the control elements 402 are charged up proportionally to the intensity of the electron beam from the electron gun 440. The electron beam is scanned across conductive pads of the control elements 402 to provide different voltage levels to control input signal mirror array 420. Thus, input signal mirror array 420 can redirect light beams from optical inputs 450 to varying positions, which is controlled by the scanning of electron beams from electron gun 440.

Furthermore, control elements 402 are positioned on an opposite side of a wafer connected by solid electrical via connections 401 that conduct the control voltage but maintain the vacuum away from the mirrors. To avoid the complexities of operating under a vacuum, as illustrated in FIG. 4, a scanning control optical beam can be used. Exemplary implementations using a scanning control optical beam to control gimbaled mirrors 206 are illustrated in FIGS. 5 through 7.

Figure 5:
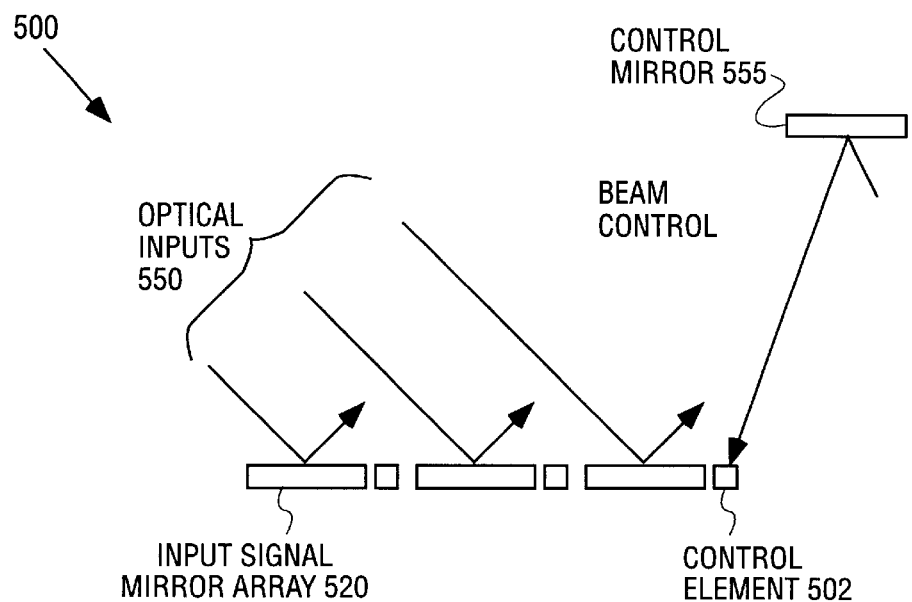
FIG. 5 illustrates a side view of an exemplary optical switching device to control a switch mirror array using a scanning optical beam.

FIG. 5 illustrates a side view of an exemplary optical switching device 500 to control a switch mirror array using a scanning control optical beam. Referring to FIG. 5, optical switching device 500 includes optical inputs 550, input signal mirror array 520, control elements 502, and control mirror 555.

The control elements 502 can be circuits as described in FIGS. 3A through 3E to provide an electrode drive voltage for input signal mirror array 520. A control mirror 555 can be used to redirect an optical beam ("light beams") to control elements 502. Control mirror 555 can be used to scan the optical beam to the control elements 502. Thus, control mirror 555 can control individual mirror devices for input signal mirror array to redirect light beams from optical inputs 550 to varying positions by the manner the control elements 502 are scanned by control mirror 555.

Figure 6:
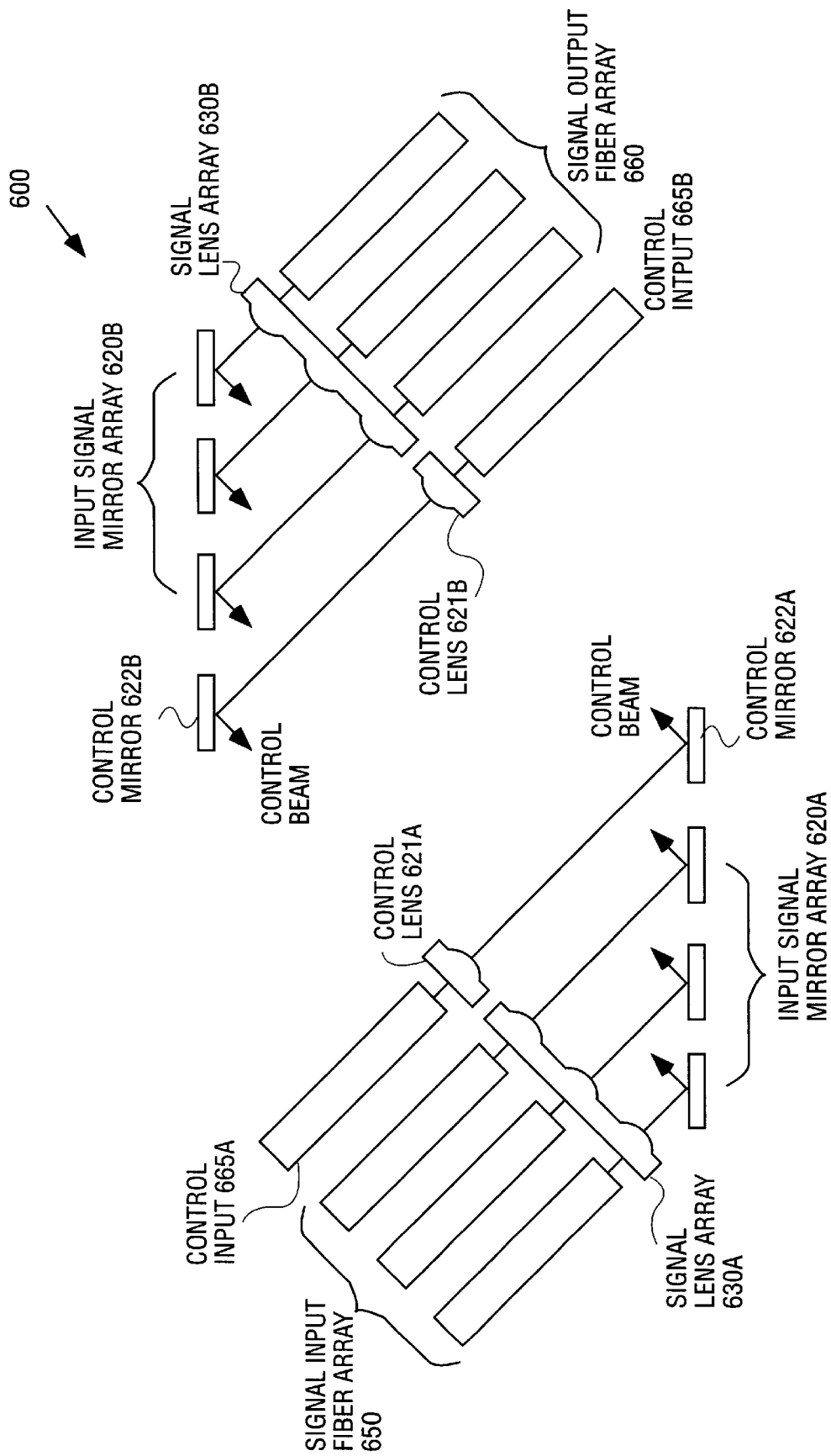
FIG. 6 illustrates a side view of another exemplary optical switching device having optical control beams directed by mirrors in switch mirror arrays.
Figure 7:
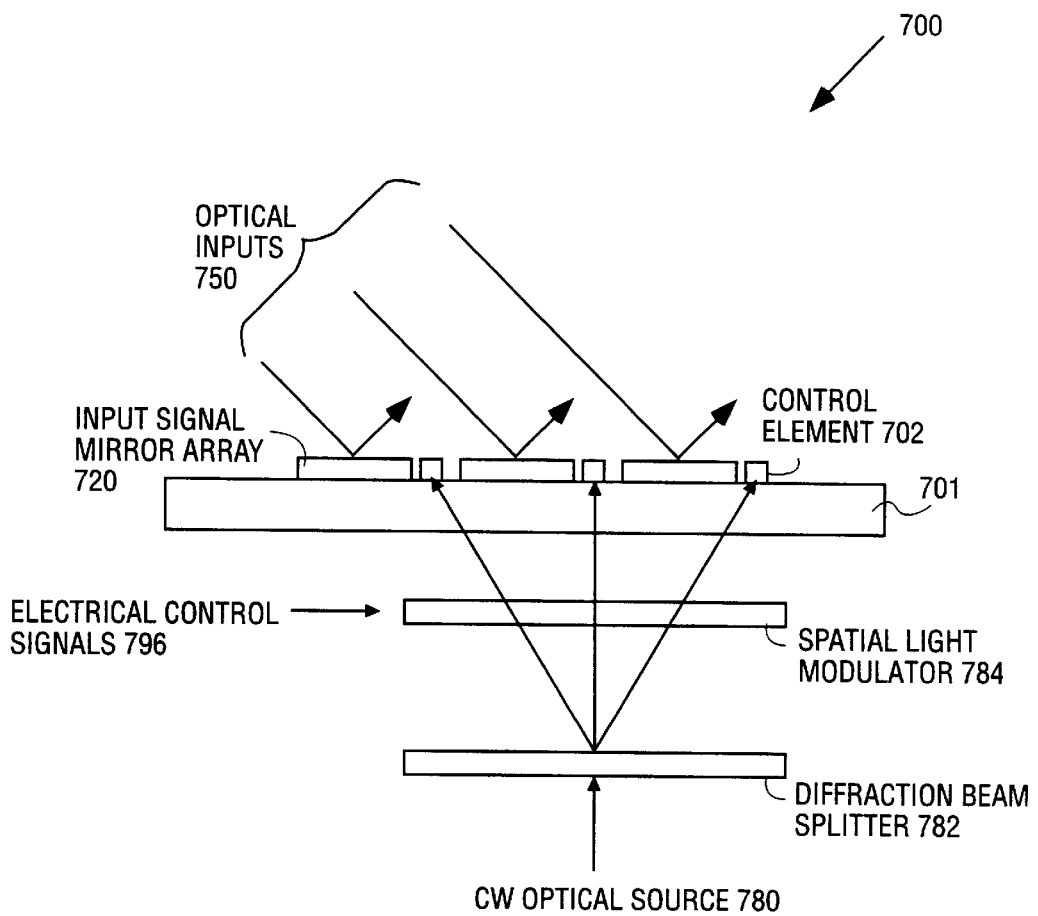
FIG. 7 illustrates a side view of another exemplary optical switching device having a spatial light modulator to vary the optical intensity of optical control beams.

FIG. 6 illustrates a side view of another exemplary optical switching device 600 having optical control beams directed by mirrors in switch mirror arrays. Referring to FIG. 6, optical switching device 600 includes signal input fiber array 650, control input 665A, signal lens array 630A, control lens 621A, input signal mirror array 620A, control mirror 622A, input signal mirror array 620B, control mirror 622B, signal lens array 630B, control lens 621B, signal output fiber array 660, and control input 665B.

Control input 665A, which outputs a control beam to control input signal mirror array 620B, is part of signal input fiber array 650. Control input 665B, which outputs a control beam to control the input signal mirror array 620A, is part of signal output fiber array 660.

Control mirrors 622A and 622B are integrated with input signal mirror array 620A and input signal mirror array 620B, respectively. The control mirror 622A controls the direction of a "control beam" for input signal mirror array 620A. The control mirror 622B controls the direction of a "control beam" for input signal mirror array 620B. For example, control mirrors 622A and 622B can direct control beams to control elements, as shown in FIGS. 1 and 2, to move individual mirrors for input signal mirror arrays 620A and 620B.

In one implementation, control mirrors 622A and 622B update control elements frequently to maintain a certain voltage level for a desired mirror position angle for the input signal mirror arrays 620A and 620B. For example, if individual mirrors for input signal mirror arrays 620A and 620B operate at a 1 kHz frequency, each individual mirror must be updated by a control beam every 0.001 seconds.

For one implementation, to allow control mirrors 622A and 622B to switch frequently, control mirrors 622A and 622B are constructed to be smaller than individual mirrors of input signal mirror arrays 620A and 620B. That is, control mirrors 622A and 622B may have a smaller area than individual mirrors of the input signal mirror arrays 620A and 620B.

For another implementation, to increase the speed of the control mirrors 622A and 622B, the control mirrors 622A and 622B are driven near its resonance frequency. The control mirrors 622A and 622B can scan in two axes to direct control beams to control elements.

The size of the mirrors for input signal mirror arrays 620A and 620B can be determined by diffraction, which causes the signal beams to spread as they travel from one mirror array to the other. For example, the mirrors for input signal mirror arrays 620A and 620B can have a diffraction of 1.3 um to 1.55 um wavelength, while control mirrors 622A and 622B can be operated 810 nm wavelength or even shorter.

Signal lens arrays 630A and 630B are silicon lenses. Alternatively, signal lens arrays 630A and 630B are glass lenses. Control lenses 621A and 621B are glass lenses because of its higher refractive index. Alternatively, control lenses 621A and 621B can be an epoxy lens in which the control beams would be absorbed by a silicon lens if the control optical wavelength is shorter than approximately 1 um.

FIG. 7 illustrates a side view of another exemplary optical switching device 700 having a spatial light modulator to vary the optical intensity of optical control beams. Referring to FIG. 7, optical switching device 700 includes a continuous wave (CW) optical source 780, diffraction beam splitter 782, spatial light modulator 784 receiving electrical control signal 796, substrate 701, control elements 702, input signal mirror array 720, and optical inputs 750.

CW optical source 780 outputs a continuous wave optical beam to a diffraction beam splitter 782. Diffraction beam splitter 782 splits the optical beam from the CW optical source 780 to spatial light modulator 784. Spatial light modulator 784 directs the split optical beams to control elements 702 through a substrate 701 to control input signal mirror array 720. Spatial light modulator 784 can also be used to vary the intensity of the optical beam to the control elements 702, which are formed on the same plane as the mirror arrays.

For an alternative implementation, the control elements 702 can be formed on the opposite side of substrate 701 from the input signal mirror array 720. The control elements 702 can then be connected to the input signal mirror array 720 using through-wafer connections.

Figure 8A:
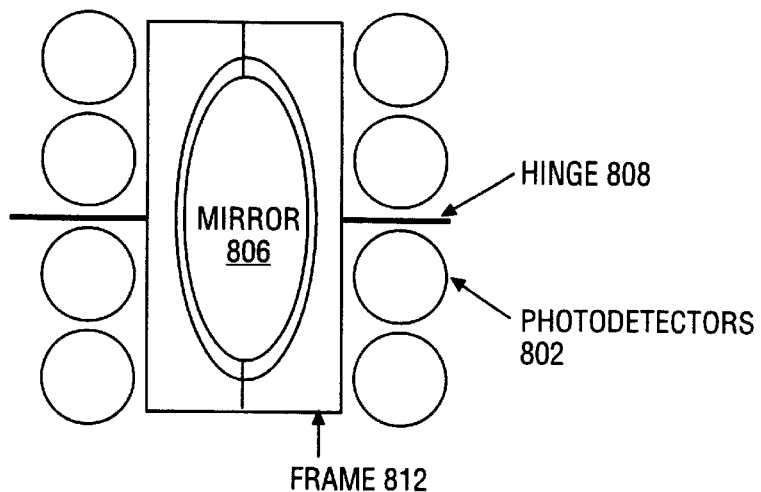
FIG. 8A is a top view of an exemplary mirror device being controlled with photodetectors.

FIG. 8A is a top view of an exemplary mirror device being controlled with photodetectors. Referring to FIG. 8A, a mirror 806 supported by a frame 812 and hinge 808 and photodetectors 802 are shown.

For one implementation, to aid in the scanning of control beams, photodetectors 802 can be positioned in between mirrors and/or in between rows of mirrors. Photodetectors 802 can control selectively an electrode drive voltage for mirror 806. For example, photodetectors 802 can include circuitry as shown in FIGS. 3A through 3E.

Figure 8B:
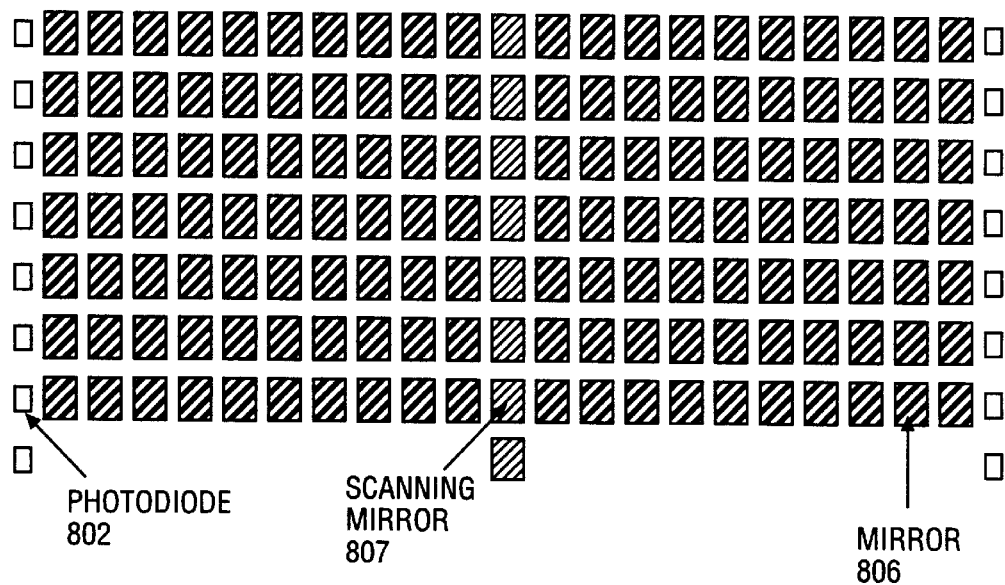
FIG. 8B is a top view of an exemplary switch mirror array with scanning mirrors and photodiodes.

FIG. 8B is a top view of an exemplary switch mirror array with scanning mirrors and photodiodes. Referring to FIG. 8B, to aid in the scanning of control beams, sensing photodiodes 802 can be positioned at the end of rows and/or in between mirrors of a switch mirror array depending on the availability of space on a substrate. Redundant or duplicate scanning mirrors 807 can be added in case of failure of one of the scanning mirrors 807.

Thus, an optical switch having switch mirror arrays controlled by scanning beams has been described, which reduces the amount of electrical connections required and reduces the complexity for large optical switches.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An optical switch, comprising:
   one or more arrays of optical switch inputs and outputs;
   one or more arrays of movable mirrors to direct light beams from the optical switch inputs to the optical switch outputs, wherein the one or more arrays of movable mirrors are separate from the one or more arrays of optical switch inputs and outputs; and
   one or more control elements to control the movable mirrors based on electron beams directed to the control elements.

2. The optical switch of claim 1, wherein the electron beams are directed to the control elements in free space.

3. The optical switch of claim 1, wherein each of the one or more control elements comprises one or more conductive pads.

4. The optical switch of claim 1, further comprising:
   an electron gun to output the electron beams; and
   a deflector to direct the electron beams to the control elements.

5. A method, comprising:
   generating one or more electron beams; and
   controlling movement of one or more movable switch mirrors using the one or more electron beams by outputting one of the electron beams to one of the or more control elements coupled to an electrode.

6. The method of claim 5, wherein the electrode is positioned under one of the movable switch mirrors.

7. The method of claim 5, further comprising generating a drive voltage for the electrode.

8. The method of claim 5, wherein outputting the electron beams to one or more control elements includes outputting the electron beams in free space to the control elements.

9. The method of claim 5, wherein controlling movement of the one or more movable switch mirrors includes changing a position of the movable switch mirrors from an equilibrium position.

10. An optical switch, comprising:
    an optical source to provide an optical beam;
    a diffraction beam splitter to receive the optical beam from the optical source and to split the optical beam into multiple beams; and
    a spatial light modulator to direct the multiple beams to a switch mirror array, the switch mirror array having one or more control elements, each of the one or more control elements coupled to receive one of the multiple beams, each control element to control movement of an individual mirror based on the correspondingly received one of the multiple beams.

11. The optical switch of claim 10, wherein the spatial light modulator varies the intensity of one or more of the multiple beams.

12. The optical switch of claim 10, wherein the optical source comprises a continuous wave optical source.

13. The optical switch of claim 12, wherein the optical beam comprises a continuous wave optical beam.

14. An optical switch, comprising:
    one or more arrays of optical switch inputs and outputs;
    one or more arrays of movable mirrors to direct one or more signal beams from the optical switch inputs to the optical switch outputs; and
    one or more control elements to control the movable mirrors based on one or more control beams directed to the control elements, wherein the control beams and the signal beams follow substantially parallel paths over substantially similar distances between the optical switch inputs and the movable mirrors.

15. The optical switch of claim 14, wherein the paths of the control beams are separate from the paths of the signal beams between the optical switch inputs and the movable mirrors.

16. The optical switch of claim 14, wherein the control beams are directed to places other than the movable mirrors.

17. The optical switch of claim 14, wherein each of the control elements is integrated with one or more of the movable mirrors.

18. An optical switch, comprising:
    one or more arrays of optical switch inputs and outputs;
    one or more arrays of movable mirrors to direct one or more signal beams from the optical switch inputs to the optical switch outputs; and
    one or more control elements to control the movable mirrors based on one or more control beams directed to the control elements, wherein the paths of the control beams are separate from the paths of the signal beams between the optical switch inputs and the movable mirrors, wherein the control beams are directed to places other than the movable mirror and, wherein the movable mirrors do not reflect the control beams.

19. An optical switch, comprising:
    one or more arrays of optical switch inputs and outputs;
    one or more arrays of movable mirrors to direct one or more signal beams from the optical switch inputs to the optical switch outputs; and
    one or more control elements to control the movable mirrors based on one or more control beams directed to the control elements, wherein the paths of the control beams are separate from the paths of the signal beams between the optical switch inputs and the movable mirrors, wherein the movable mirrors are outside the paths of the control beams.

20. An optical switch, comprising:
    one or more arrays of optical switch inputs and outputs;
    one or more arrays of movable mirrors to direct one or more signal beams from the optical switch inputs to the optical switch outputs; and
    one or more control elements to control the movable mirrors based on one or more control beams directed to the control elements, wherein the paths of the control beams are separate from the paths of the signal beams between the optical switch inputs and the movable mirrors, wherein each of one or more control elements provides a drive voltage to each of one or more electrodes upon receipt of a control beam by the control element.

21. The optical switch of claim 20, wherein each electrode moves one or more movable mirrors in a certain direction upon receipt of the drive voltage by the electrode.

22. An optical switch comprising:
one or more arrays of optical switch inputs and outputs;
one or more arrays of movable mirrors to direct one or more signal beams from the optical switch inputs to the optical switch outputs, wherein an array of movable mirrors is formed on a common substrate;
one or more control elements to control the movable mirrors based on one or more control beams directed to the control elements, wherein each of the control elements is integrated with one or more of the movable mirrors.

23. The optical switch of claim 22, wherein the paths of the control beams are separate from the paths of the signal beams between the optical switch inputs and the movable mirrors.

24. The optical switch of claim 22, wherein the control beams are directed to places other than the movable mirrors.

25. An optical switch, comprising:
one or more arrays of optical switch inputs and outputs;
one or more arrays of movable mirrors to direct one or more signal beams from the optical switch inputs to the optical switch outputs; and
one or more control elements to control the movable mirrors based on one or more control beams directed to the control elements, wherein the control beams and the signal beams follow substantially parallel paths between the optical switch inputs and the movable mirrors, wherein a receiving surface of each control element is coplanar with a receiving surface of one or more movable mirrors when the movable mirrors are in the equilibrium position.

26. An optical switch, comprising:
one or more arrays of optical switch inputs and outputs;
one or more arrays of movable mirrors to direct one or more signal beams from the optical switch inputs to the optical switch outputs; and
one or more control elements to control the movable mirrors based on one or more control beams directed to the control elements, wherein the control beams and the signal beams follow substantially parallel paths between the optical switch inputs and the movable mirrors, wherein each of one or more control elements provides a drive voltage to each of one or more electrodes upon receipt of a control beam by the control element.

27. The optical switch of claim 26, wherein each electrode moves one or more movable mirrors in a certain direction upon receipt of the drive voltage by the electrode.

28. An optical switch, comprising:
one or more arrays of optical switch inputs and outputs;
one or more arrays of movable mirrors to direct one or more signal beams from the optical switch inputs to the optical switch outputs; and
one or more control elements to control the movable mirrors based on one or more control beams directed to the control elements, wherein each of the control elements is integrated with one or more of the movable mirrors, wherein each of one or more control elements provides a drive voltage to one or more electrodes upon receipt of a control beam by the control element.

29. The optical switch of claim 28, wherein each electrode moves one or more movable mirrors in a certain direction upon receipt of the drive voltage by the electrode.

30. An optical switch, comprising:
one or more arrays of optical switch inputs and outputs;
one or more arrays of movable mirrors to direct one or more signal beams from the optical switch inputs to the optical switch outputs; and
one or more control elements to control the movable mirrors based on one or more control beams directed to the control elements, wherein each of the one or more control elements provides a drive voltage to one or more electrodes upon receipt of a control beam by the control element.

31. An optical switch, comprising:
one or more arrays of optical switch inputs and outputs;
one or more arrays of movable mirrors to direct one or more signal beams from the optical switch inputs to the optical switch outputs; and
one or more control elements to control the movable mirrors based on one or more control beams directed to the control elements, wherein each of the one or more control elements provides a drive voltage to one or more electrodes upon receipt of one of the control beams by the control element, wherein each electrode moves one or more movable mirrors in a certain direction upon receipt of the drive voltage by the electrode.

32. The optical switch of claim 31, wherein each of the control elements is integrated with one or more of the movable mirrors.

33. The optical switch of claim 31, wherein the paths of the control beams are separate from the paths of the signal beams between the optical switch inputs and the movable mirrors.

34. The optical switch of claim 33, wherein the control beams and the signal beams follow substantially parallel paths between the optical switch inputs and the movable mirrors.

35. The optical switch of claim 31, wherein the control beams are directed to places other than the movable mirrors.

36. An optical switch, comprising:
one or more arrays of optical switch inputs and outputs;
one or more arrays of movable mirrors to direct one or more signal beams from the optical switch inputs to the optical switch outputs; and
one or more control devices, wherein each control device moves one or more movable mirrors in a particular direction based on the intensity of one or more scanning control beams directed to the control device.

37. The optical switch of claim 36, wherein each of the one or more control devices comprises one or more electrodes.

38. The optical switch of claim 37, wherein an electrode moves one or more movable mirrors in a certain direction upon receipt of a scanning control beam by the electrode.

39. The optical switch of claim 38, wherein the electrode moves the one or more movable mirrors by electrostatic actuation.

40. The optical switch of claim 36, wherein each of the one or more control devices further comprises one or more control elements.

41. The optical switch of claim 40, wherein one or more of the control elements is a photodetector.

42. The optical switch of claim 40, wherein a control element provides a drive voltage to one or more electrodes upon receipt of a control beam by the control element.

43. The optical switch of claim 42, wherein each electrode moves one or more movable mirrors in a certain direction upon receipt of the drive voltage by the electrode.

44. The optical switch of claim 43, wherein each electrode moves the one or more movable mirrors by electrostatic actuation.

45. The optical switch of claim 36, wherein the paths of the scanning control beams are separate from the paths of the signal beams between the optical switch inputs and the movable mirrors.

46. The optical switch of claim 36, wherein the control beams and the signal beams follow substantially parallel paths between the optical switch inputs and the movable mirrors.

47. The optical switch of claim 40, wherein each of the control elements is integrated with one or more of the movable mirrors.

48. The optical switch of claim 1, wherein the one or more control elements are positioned at the ends of one or more rows of movable mirrors of one or more arrays of movable mirrors.

49. The optical switch of claim 1, wherein the one or more control elements are positioned in between the movable mirrors of one or more arrays of movable mirrors.

* * * * *